United States Patent [19]

Formhals

[11] 4,265,429
[45] May 5, 1981

[54] GRAIN AUGER JACK

[76] Inventor: Gary G. Formhals, R.R. #1, Smithfield, Ill. 61477

[21] Appl. No.: 94,919

[22] Filed: Nov. 16, 1979

[51] Int. Cl.$^3$ .............................................. B66F 3/36
[52] U.S. Cl. ................................ 254/100; 254/86 R; 198/302
[58] Field of Search ....................... 198/302, 317–320; 254/45, 30, 86 H, 98, 100, 101

[56] References Cited

U.S. PATENT DOCUMENTS

| 3,314,692 | 4/1967 | Karns | 254/86 R X |
| 3,647,052 | 3/1972 | Edinger | 198/302 |

Primary Examiner—Robert C. Watson
Attorney, Agent, or Firm—Harvey B. Jacobson

[57] ABSTRACT

A mount is provided for support from one side of the lower end portion of an inclined elongated tubular auger conveyor housing. A first vertically elongated jack base section is provided and a second vertically elongated jack section is guidingly supported from the base section for vertical adjustment relative thereto. Manually operable jack structure is operatively connected between the first and second jack sections for effecting vertical adjustment of the second section relative to the first section and the second section includes a lower end portion projecting downwardly below the first section and provided with support wheel structure thereon for engagement with the ground. Support structure is provided and pivotally supports the first section from the mount for adjustable angular displacement of the first section relative to the mount about a horizontal axis disposed generally normal to a vertical plane containing the conveyor housing.

3 Claims, 6 Drawing Figures

GRAIN AUGER JACK

BACKGROUND OF THE INVENTION

Inclined auger conveyors are use to convey grain and other materials and are usually equipped with support wheels for supporting the upper end of the conveyor from the ground and a hitch structure at the lower end whereby the conveyor may be towed from one location to another. However, conventional auger conveyors of this type are usually not provided with structure enabling them to be readily manually shifted for short distances and also enabling the lower ends thereof to be vertically adjusted as desired. Accordingly, a need exists for an auger conveyor equipped with a lower end support wheel mounted for vertical adjustment relative to the conveyor.

Examples of various forms of wheeled jacking mechanisms including some of the general structural and operational features of the instant invention are disclosed in U.S. Pat. Nos. 28,268, 2,458,961, 2,638,315, 2,939,679 and 3,022,043.

BRIEF DESCRIPTION OF THE INVENTION

The combined support wheel and jack assembly of the instant invention is constructed in a manner whereby it may be readily supported from the lower end of an inclined tubular auger conveyor housing and vertically extended relative to the housing in order that the support wheel may support the lower end of the inclined housing in adjusted position relative to the ground.

In addition, the combined support wheel and jack assembly is provided with mounting structure therefor to be used in supporting the support wheel and the jack assembly from an inclined tubular auger conveyor housing in a manner such that the support wheel and jack assembly may be angularly adjusted relative to the associated auger conveyor housing about a horizontal axis extending transversely of the conveyor housing.

The main object of this invention is to provide a vertically adjustable wheeled landing gear for the lower end of a tubular auger conveyor housing.

Another object of this invention is to provide a combined support wheel and jack assembly in accordance with the preceding object and constructed in a manner whereby it may be readily attached to existing tubular auger conveyor housings and also incorporated into the manufacture of new conveyor housings.

Still another object of this invention is to provide a combined support wheel and jack assembly in accordance with the preceding objects and constructed in a manner whereby it may be vertically and angularly adjusted relative to the associated tubular auger conveyor housing about a horizontal axis extending transversely of the associated tubular auger conveyor housing.

Another very important object of this invention is to provide a combined support wheel and jack assembly constructed in a manner whereby it may be readily removed from an associated auger conveyor housing and removably supported from other types of equipment upon which a jack is needed.

A final object of this invention to be specifically enumerated herein is to provide a combined support wheel and jack assembly for the lower end of an inclined tubular auger conveyor housing and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
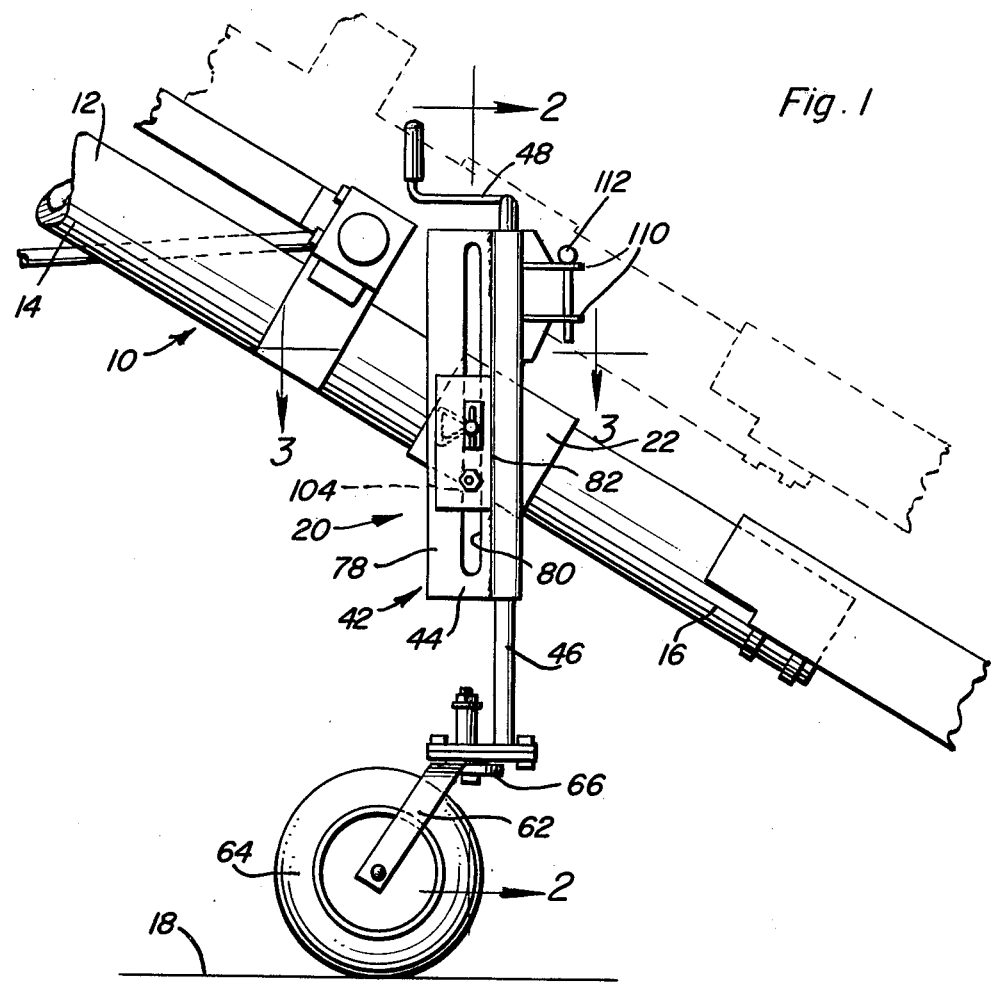
FIG. 1 is a fragmentary side elevational view of the lower end of a conventional form of an inclined auger conveyor and with the combined support wheel and jack assembly of the instant invention operatively associated with the auger conveyor housing.
Figure 4:
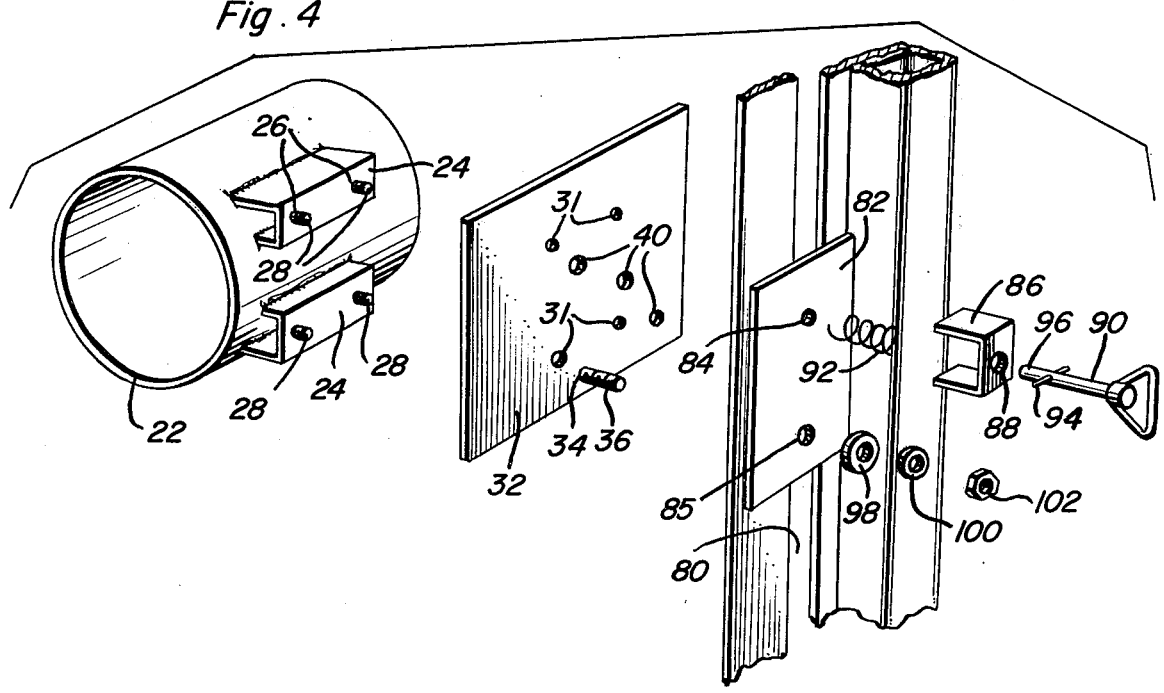
FIG. 4 is a fragmentary exploded perspective view of the mounting ring portion for the combined support wheel and jack assembly and the various components by which the vertically adjustable jack assembly of the invention is supported from the mounting ring portion for angular displacement about a horizontal transverse axis.
Figure 2:
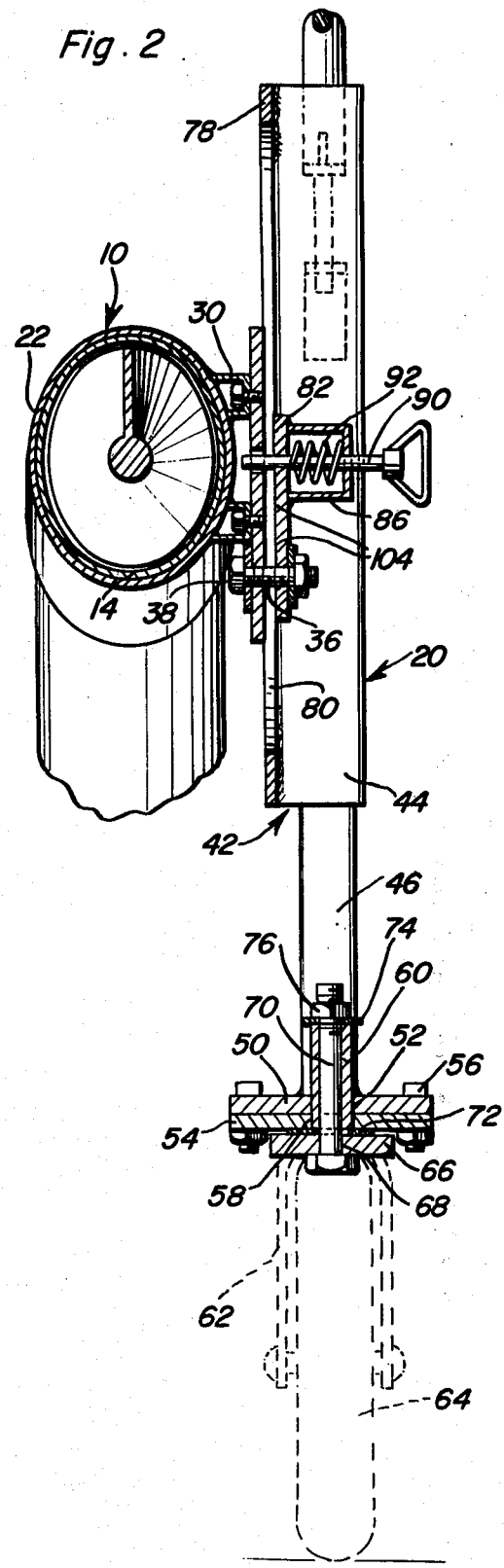
FIG. 2 is an enlarged fragmentary transverse vertical sectional view taken substantially upon the plane indicated by the section line 2—2 of FIG. 1.
Figure 3:
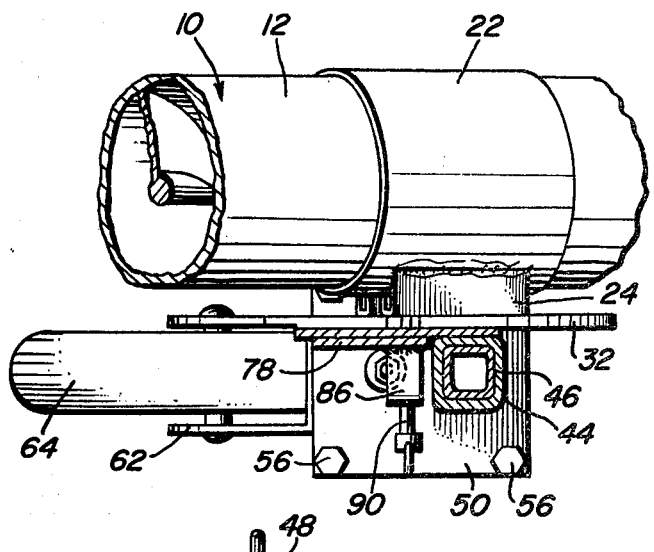
FIG. 3 is an enlarged fragmentary horizontal sectional view taken substantially upon the plane indicated by the section line 3—3 of FIG. 1.
Figure 5:
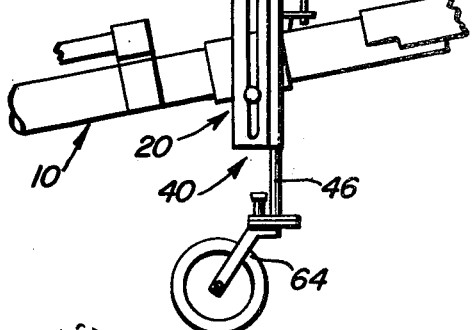
FIG. 5 is a fragmentary side elevational view of the combined support wheel and jack assembly and with the auger conveyor in angularly displaced position relative to the position thereof illustrated in FIG. 1.
Figure 6:
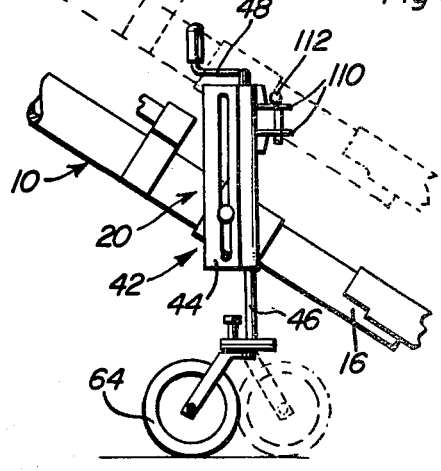
FIG. 6 is a fragmentary elevational view similar to FIG. 5 but illustrating the manner in which the combined support wheel and jack assembly may be utilized to elevate and depress the lower end of the auger conveyor housing.

Referring now more specifically to the drawings, the numeral 10 generally designates a conventional form of auger conveyor including an inclined housing 12 having an upper end portion 14 and a lower end portion 16. The auger conveyor is conventionally equipped with ground engaging support wheels (not shown) supported from the upper end portion 14 and the lower end portion 16 of the housing 12 is illustrated in FIG. 1 as supported from the ground 18 through the utilization of the combined support wheel and jack assembly 20 of the instant invention. The assembly 20 includes a mounting ring 22 secured about the lower end portion 16 of the housing 12 in predetermined position thereon in any convenient manner. The mounting ring 22 includes a pair of substantially coplanar mounting brackets 24 including apertures 26 formed therethrough. The threaded shank portions 28 of headed fasteners 30 are received through the apertures 26 and threadedly engaged in threaded bores 31 formed in a vertical mounting plate 32. The free ends of the shank portions 28 are flush with the surface of the plate 32 remote from the brackets 24 and the plate 32 includes an aperture 34 formed therethrough. The threaded shank 36 of a headed fastener 38 is received through the aperture 34 and the mounting plate 32 includes three openings 40 formed therethrough angularly spaced about the aperture 34 and spaced equally therefrom.

A screw jack 42 is provided and includes a first vertically elongated base section 44 and a second vertically elongated section 46 guidingly supported from the section 44 for vertical adjustment relative thereto. In addition, it is to be understood that the jack 42 includes conventional crank operated jack screw mechanism 48 operably connected between the sections 44 and 46 for raising and lowering the section 46 relative to the section 44.

The lower end of the second section 46 includes a horizontal plate 50 supported therefrom and the plate 50 includes a vertical bore 52 formed thereto. A lower plate 54 is secured to the underside of the plate 50 by a plurality of threaded fasteners 56 and the plate 54 includes a bore 58 formed therethrough registered with the bore 52. The lower end of an upstanding sleeve 60 extends through the bores 52 and 58 and is welded to the plate 54. An inverted U-shaped wheel mount 62 is provided and has a rubber tired wheel 64 journaled therefrom. The upper end of the wheel mount 62 includes a horizontal mounting plate portion 66 having a bore 68 formed therethrough registered with the bores 52 and 58 and a bolt 70 welded to mounting plate portion 66 extends upwardly through the bore 68 and the sleeve 60, a washer 72 being disposed on the bolt 70 between the mounting plate portion 66 and the underside of the plate 54. A washer 74 is disposed on the upper end portion of the bolt 70 which projects above the sleeve 60 and a self-locking nut 76 is threaded on the upper end of the bolt 70 above the washer 74. In this manner, a caster wheel assembly including the wheel 64 is rotatably supported from the lower end of the second section 46 of the screw jack 42.

The first section 44 of the screw jack 42 includes an upstanding plate portion 78 extending therealong and including a vertical slot 80 formed therein. A slide plate 82 is provided and slidably overlaps the side of the plate portion 78 remote from plate 32. The plate 82 includes vertically spaced bores 84 and 85 formed therethrough and a U-shaped mounting bracket 86 is secured by welding to the plate 82 above and below the bore 84. The bracket 86 includes a bore 88 in its bight portion through which a latch pin 90 is slidably received. The latch pin 90 has a compression spring 92 mounted thereon between the bight portion of the mounting bracket 86 and a diametric pin 94 received through the pin 90. Thus, the spring 92 biases the pin 94 toward the plate 82 and the rounded end 96 of the pin 90 through the bore 84. The shank portion 36 of the fastener 38 is received through the bore 86 and has a flat washer 98, a lock washer 100 and a threaded bolt 102 thereon. The fastener 38 comprises a pivot fastener for the plate 82 and the bore 84 is registrable with the openings 40. Thus, the pin 90 may be projected through the bore 84 and into a selected one of the openings 40 to lock the first section 44 of the screw jack 42 in adjusted angularly displaced positions relative to the mounting plate 32.

In operation, the mounting ring 22 is secured to the housing 12 of the auger conveyor 10 in any convenient manner such as by welding and the mounting plate 32 may be secured to the mounting brackets 24 by the fasteners 30 to thus mount the screw jack 42 on the lower end portion 16 of the housing 12. Thereafter, the screw jack mechanism 48 may be actuated to vertically adjust the second section 46 relative to the first section 44 and the locking pin 90 may be withdrawn from the associated opening 44 and the first section 44 of the screw jack 42 may be angularly displaced about the fastener 38 to align a different opening 40 with the bore 84 and the locking pin 90 may then be released for projection into the different opening 40 registered with the bore 84 to thus lock the screw jack 42 in a different angularly adjusted position relative to the housing 12. Of course, the screw jack 42 is preferably maintained in a substantially vertical position when in use.

The forward side of the first section 44 of the screw jack 42 includes a pair of vertically spaced apertures mounting flanges 110 and a locking pin 112 is received through the flanges 110. The flanges 110 and the locking pin 112 may be utilized to support the support jack 42 from other equipment when the support jack 42 is removed from engagement with the mounting plate 32 by removal of the nut 102. Thus, it may be seen that the support jack 42 may be readily disassembled from the conveyor 10 and utilized elsewhere.

The foregoing is considered as illustrative only of the principles of the invention. Further, since numerous modifications and changes will readily occur to those skilled in the art, it is not desired to limit the invention to the axact construction and operation shown and described, and accordingly, all suitable modifications and equivalents may be resorted to, falling within the scope of the invention.

What is claimed as new is as follows:

1. In combination with an inclined elongated tubular auger conveyor housing, a combined support wheel and jack assembly for the lower end of said housing, said housing including a mount supported from one side of said housing, a first vertically elongated jack base section and a second vertically elongated jack section guidingly supported from said base section for vertical adjustment relative thereto, manually operable jack means connected between said first and second sections for vertical adjustment of the second section relative to the first section, said second section including a lower end portion projecting downwardly below said first section and having a support wheel structure supported from its lower end, support means pivotally supporting said first section from said mount for adjustable angular displacement of said first section relative to said mount about a horizontal axis disposed generally normal to a vertical plane containing said housing, said mount including a substantially vertical mounting plate, said first jack section including an outstanding vertical plate portion having a slot formed therein generally paralleling said first jack section, one side of said vertical plate portion opposing and contacting the outer side of said mounting plate, a slide and clamp plate overlying the other side of said vertical plate portion, releasable clamp-type pivot fastener means secured through said slot and between said mounting plate and slide and clamp plate oscillatably supporting the latter and said plate portion from said mounting plate for angular displacement relative to said mounting plate about said pivot fastener means, said mounting plate and slide and clamp plate including coacting latch means engageable with each other through and slidable along said slot for retaining said plate portion in adjusted angular displacement relative to said mounting plate, said clamp-type pivot fastener means serving not only as a pivot connection between said mounting plate and said slide and clamp plate as well as upstanding plate portion, but also as structure for retaining said vertical plate portion in adjusted longitudinally shifted position relative to said mounting plate and slide and clamp plate.

2. The combination of claim 1 wherein said mount includes a mounting ring encircling and supported from said tubular housing and from which said vertical mounting plate is supported one side of said mounting ring.

3. The combination of claim 1 wherein said support wheel structure comprises a caster wheel assembly pivotally supported from said lower end of said second portion for angular displacement relative thereto about a substantially vertical axis.

* * * * *